United States Patent [19]

Washburn et al.

[11] Patent Number: 5,501,223
[45] Date of Patent: Mar. 26, 1996

[54] DYNAMIC FIRING SEQUENCE FOR ULTRASOUND IMAGING APPARATUS

[75] Inventors: Michael J. Washburn, New Berlin; Rowland F. Saunders, Hartland, both of Wis.

[73] Assignee: General Electric Company, Milwaukee, Wis.

[21] Appl. No.: 344,045

[22] Filed: Nov. 23, 1994

[51] Int. Cl.$^6$ .................................................. A61B 8/00
[52] U.S. Cl. ............................................... 128/661.09
[58] Field of Search ............... 128/661.07, 660.06, 128/660.07, 661.01, 661.09, 661.1, 662.01; 73/602; 364/413.24, 413.25

[56] References Cited

U.S. PATENT DOCUMENTS 4,888,694 12/1989 Chesarek ...................... 364/413.25

Primary Examiner—George Manuel
Attorney, Agent, or Firm—B. Joan Haushalter; John H. Pilarski

[57] ABSTRACT

A dynamic firing sequence for ultrasound imaging apparatus can be achieved in accordance with the present invention. Initially, operator selected parameters are provided and predetermined system constants are stored. The operator selected parameters in B mode include imaging depth. The operator selected parameters in Doppler mode include velocity scale, doppler range gate position and Doppler range gate size. The operator selected parameters in color mode include velocity scale and region of interest depth. PRI and minimum vector time are calculated using the operator selected parameters and the predetermined system constants. These calculations are used to maximize interleaving, thereby maximizing frame rate.

8 Claims, 3 Drawing Sheets

5,501,223

1

DYNAMIC FIRING SEQUENCE FOR ULTRASOUND IMAGING APPARATUS

TECHNICAL FIELD

The present invention relates to ultrasound imaging and, more particularly, to a dynamic firing sequence for maximizing frame rate and interleaving for ultrasound imaging systems.

BACKGROUND ART

Ultrasonic echoes from deliberately launched diagnostic sound waves into tissue are attenuated in proportion to the distance that the sound waves must travel to reach the reflector, plus the distance that the resulting echoes must travel back to reach the receiver. Since sound waves are attenuated as they pass through the human body, the deeper the penetration, the greater the attenuation.

Ultrasound machines which support simultaneous B, color and Doppler imaging restrict the color and Doppler velocity scales which the user can select. Such machines may also or alternatively change the color and Doppler velocity scales together when only one has been requested to be changed. The firing sequence used is predetermined and often probe dependent. The restrictions placed on the user do not allow the user to manipulate the machine in a manner most appropriate for imaging particular anatomy and patients.

In order to increase the frame rate, it is possible to interleave B mode vectors with pulsed echoes (PE), i.e., Doppler, vectors. It is also possible to interleave color firings. Interleaving PE Doppler vectors and B vectors means firing one or more B vectors within the pulse repetition interval (PRI) of the Doppler vectors while maintaining the pulse repetition interval of the Doppler vector. Interleaving PE Doppler vectors and color vectors means firing color vectors within the pulse repetition interval of the Doppler vectors while maintaining the pulse repetition interval of the Doppler and color vectors. Interleaving color vectors with other color vectors means firing one or more color vectors within the pulse repetition interval of another color vector while maintaining the pulse repetition interval of all of the color vectors.

Current ultrasound machines determine whether interleaving is possible, and perform the interleaving, based upon fixed protocols. Unfortunately, the fixed protocols do not always allow interleaving for a particular image when it is possible and, therefore, the maximum frame rate is not attained. Furthermore, the fixed protocols do not always generate the maximum amount of interleaving for a particular image, again, not attaining the maximum frame rate.

It would be desirable then to have a dynamic firing sequence for an ultrasound imaging machine which maximizes frame rate and maximizes interleaving.

SUMMARY OF THE INVENTION

The present invention provides a dynamic firing sequence for ultrasound B, color and Doppler imaging. The dynamic firing sequence of the present invention maximizes frame rate, allows interleaving when interleaving is possible, and maximizes interleaving.

In accordance with one aspect of the present invention, a dynamic firing sequence for ultrasound imaging systems is achieved. Initially, operator selected parameters are provided and predetermined system constants are stored. The operator selected parameters in B mode include imaging depth. The operator selected parameters in doppler mode include velocity scale, doppler range gate position and doppler range gate size. The operator selected parameters in color mode include velocity scale and region of interest depth. PRI and minimum vector time are calculated using the operator selected parameters and the predetermined system constants. These calculations are used to maximize interleaving, thereby maximizing frame rate.

Accordingly, it is an object of the present invention to provide a dynamic firing sequence for ultrasound B, color and Doppler imaging. It is another object of the present invention to maximize frame rate of an ultrasound imaging system. It is a further object of the present invention to maximize interleaving when B mode vectors and PE vectors are interleaved. It is yet another object of the present invention to maximize interleaving when color firings are interleaved with other color firings.

Other objects and advantages of the invention will be apparent from the following description, the accompanying drawings and the appended claims.

DETAILED DESCRIPTION OF THE PREFERRED EMBODIMENTS

The present invention determines a firing sequence for ultrasound B, color and Doppler imaging which maximizes frame rate, allows interleaving when interleaving is possible, and maximizes interleaving.

Frame rate is the rate at which new B or B and color images are being displayed. If, for example, it takes 0.1 seconds to acquire all the B and color data for an image, then the frame rate is 1/0.1, or 10 Hz. If more color interleaving is used, assuming more interleaving is possible, it may be possible to reduce the time it takes to acquire all the B and color data for the same image to, for example, 0.05 seconds. The frame rate is then the inverse of 0.05, or 20 Hz. The higher the frame rate, the more often new data is available to the user. For moving anatomy, this can offer a real diagnostic advantage. Since the whole intent of color mode is to look at movement of fluid, higher frame rates are advantageous.

The present invention achieves a dynamic firing sequence for ultrasound imaging apparatus wherein operator selected parameters are provided, and predetermined system constants are stored. The operator selected parameters and the predetermined system constants are used to calculate PRI and a minimum vector time. This allows for the maximization of frame rate, using the PRI calculation and the minimum vector time calculation.

Allowing the user independent control of the color and Doppler velocity scales can be accomplished in simultaneous B, color and Doppler by determining the firing sequence in real time based on the user selections. System image quality constraints are accommodated by specifying the range of allowable inputs into the determination of the firing sequence.

Figure 1:
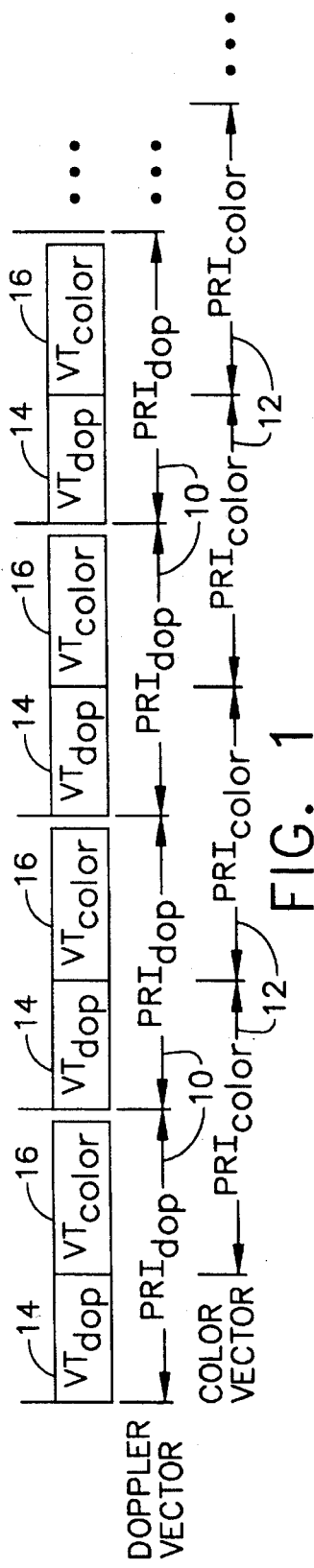
FIGS. 1, 2 and 3 illustrate interleaving of Doppler and color firings.
Figure 2:
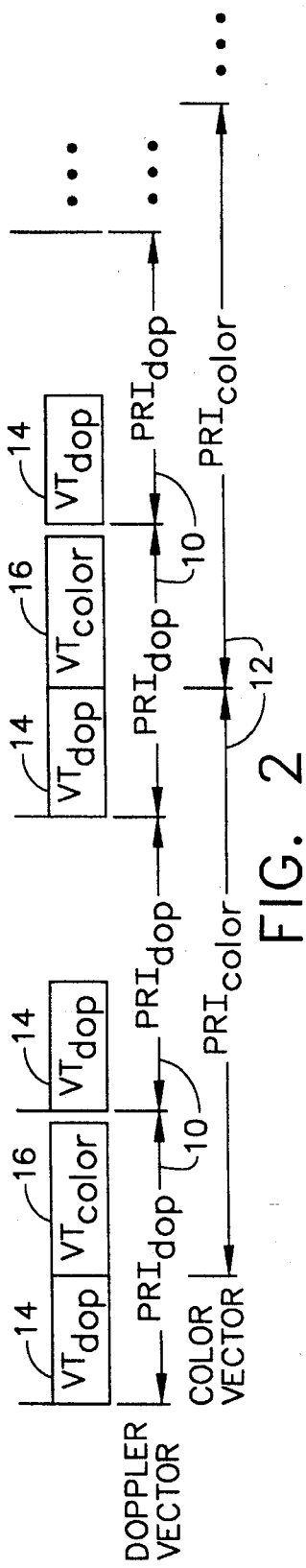
Figure 3:
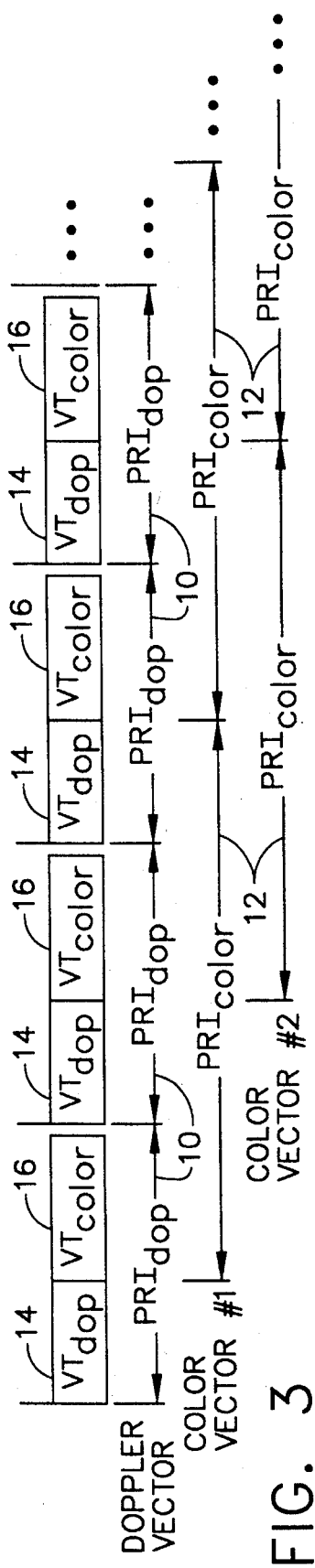

Referring now to the drawings, in FIGS. 1, 2 and 3 there are illustrated examples of interleaving of Doppler and color firings. If $VS_{dop}$ represents the Doppler velocity scale in frequency, and $VS_{color}$ represents the color velocity scale in frequency; then in the figures, $PRI_{dop}$, indicated by reference number 10, represents the pulse repetition interval of Doppler vectors, and is equal to $1/VS_{dop}$; $PRI_{color}$, indicated by reference number 12, represents the pulse repetition interval of the color vectors, and is equal to $1/VS_{color}$; $VT_{dop}$, indicated by reference number 14, represents the time required to fire the Doppler vector; and $VT_{color}$, indicated by reference number 16, represents the time required to fire the color vector.

In accordance with the present invention, the color and Doppler velocity scales selected by the user are compared to determine if interleaving Doppler and color firings is possible. If the color velocity scale is greater than the Doppler velocity scale, but within a predetermined tolerance, the color velocity scale is reduced to match the Doppler velocity scale, as illustrated in FIG. 1. If the Doppler velocity scale is within some tolerance of being an exact multiple of the color velocity scale, the color velocity scale is reduced to make the Doppler velocity scale an exact multiple of the color velocity scale, as illustrated in FIG. 2. At this point it is possible to interleave color with color as well as color with Doppler, as illustrated in FIG. 3.

Figure 4:
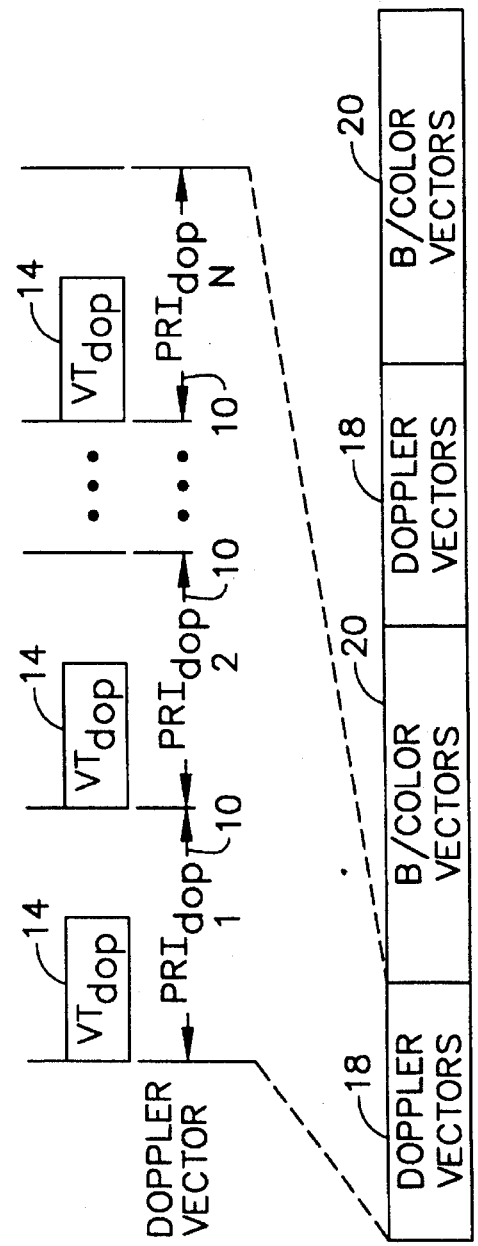
FIG. 4 illustrates a situation where no interleaving of Doppler and color firings is possible.

If none of the interleaving possibilities illustrated in FIGS. 1–3 are possible, no interleaving takes place. Instead, the B, color and Doppler vectors are fired in a sequence such as the one illustrated in FIG. 4. In FIG. 4, enough Doppler vectors to provide one Doppler spectral output, N vectors, are fired as shown by reference number 18. This is followed by a group of B, color, or B and color vectors, indicated by reference number 20. This sequence repeats continuously in order to supply the necessary B, color and Doppler image data.

In accordance with the present invention, the B mode/PE (Doppler) mode interleaving is determined by knowing the user selected PE velocity scale, the B mode vector firing time, and the PE vector firing time. The maximum allowable interleaving can be dynamically determined, in accordance with the present invention, to provide maximum interleaving and, therefore, maximum frame rate. As stated above, system image quality constraints are accommodated by specifying the range of allowable inputs in the determination of the firing sequence.

Figure 5:
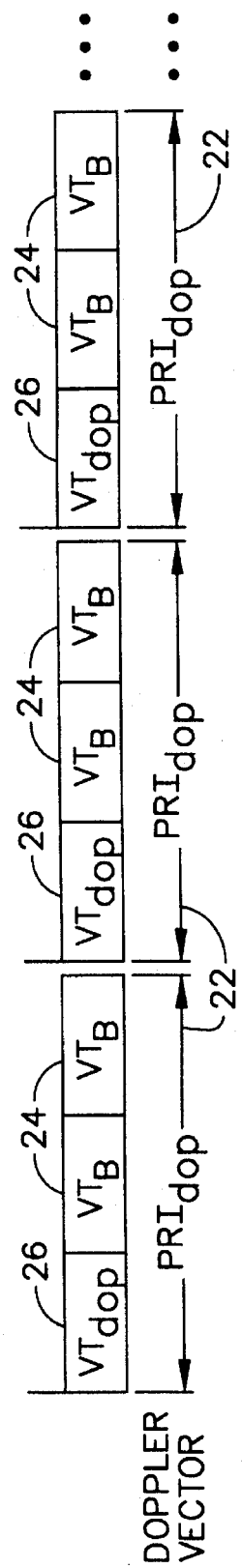
FIG. 5 illustrates interleaving of B and Doppler firings.
Figure 6:
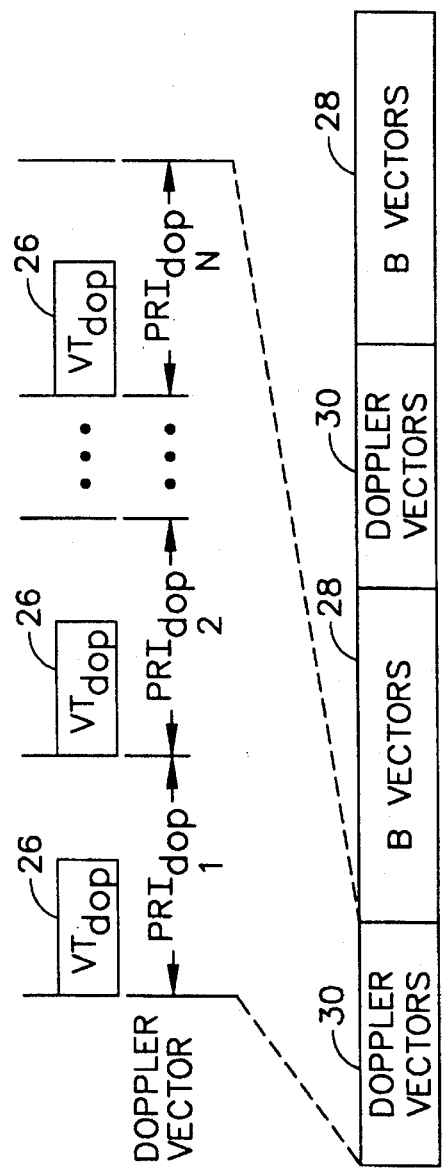
FIG. 6 illustrates a firing sequence where interleaving of B and Doppler firings is not possible.

Referring to FIGS. 5 and 6, there are illustrated examples of interleaving of B and Doppler firings, and a firing sequence where interleaving of B and Doppler firings is not possible. If $VS_{dop}$ represents the Doppler velocity scale in frequency; then in the figures $PRI_{dop}$, indicated by reference number 22, represents the pulse repetition interval of Doppler vectors, and is equal to $1/VS_{dop}$; $VT_B$, indicated by reference number 24, represents the time required to fire a B vector; and $VT_{PE}$, indicated by reference number 26, represents the time required to fire a PE vector. Consequently, a calculation for B_INT represents the number of B vectors interleaved between PE firings.

The maximum interleaving and ensuing firing sequence can then be calculated in accordance with the equation:

$$B\_INT = Integer[(PRI_{dop} - VT_{PE})/VT_B].$$

where the "integer" function truncates the value to a whole number. FIG. 5 illustrates an example of interleaving of B and Doppler firings where B_INT=2. If B_INT is zero, then interleaving is not possible. In such a situation, enough doppler vectors are fired to provide one doppler spectral output, as illustrated in FIG. 6. This is followed by a series of B vectors 28.

Figure 7:
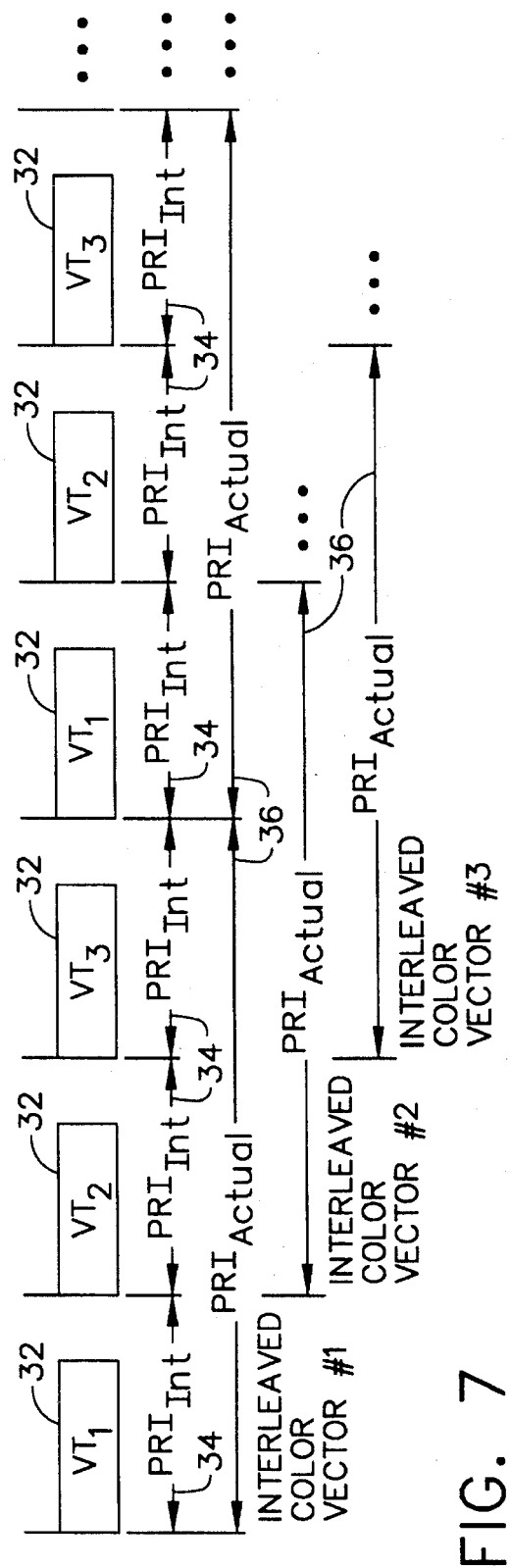
FIG. 7 illustrates a firing sequence for color interleaving.

Referring now to FIG. 7, the number of color vectors 32 ($VT_1$, $VT_2$, and $VT_3$) which can be interleaved can be dynamically determined, in accordance with the present invention, to provide maximum interleaving and, therefore, maximum frame rate. As above, system image quality constraints are accommodated by specifying the range of allowable inputs in the determination of the firing sequence.

In FIG. 7, there is illustrated a firing sequence for color interleaving. If $VS_{color}$ represents a user selected color velocity scale in frequency, and $PRI_{user}$ represents a pulse repetition interval, which is equal to $1.0/VS_{color}$; then $PRI_{int}$, indicated by reference number 34, represents a pulse repetition interval with interleaving; and $PRI_{ACTUAL}$, indicated by reference number 36, represents a pulse repetition interval actually used. A value for C_INT can then be calculated, where C_INT represents the number of color vectors being interleaved. In the equation, $VT_{color}$ represents the time required to fire a color vector.

In accordance with the present invention, the maximum interleaving and the ensuing firing sequence can be calculated according to the following equations:

$$C\_INT = MIN[\text{No. of vectors in the color wedge, integer}(PRI_{user}/VT_{color})],$$

indicates that $C_{INT}$ is the minimum of (1) the number of vectors in the color wedge and (2) the value of $PRI_{user}$ divided by $VT_{color}$, and truncated to a whole number, as indicated by the "integer" function.

$$PRI_{INT} = VT_{color} + INT_{UP}[PRI_{USER} - C\_INT * VT_{COLOR})/C\_INT];$$

where "$Int_{up}$" is an Integer-up function that rounds the value up to a whole number. Finally, $$PRI_{ACTUAL} = PRI_{INT} * C\_INT.$$

FIG. 7 illustrates an example of the color portion of the firing sequence where the interleaving, or $C_{INT}$, is equal to three. The color interleaving is based on color velocity scale and color firing time. The color firing time is based on user selections such as color region of interest depth, as well as system constraints.

The invention has been described in detail with particular reference to certain preferred embodiments thereof, but it will be understood that modifications and variations can be effected within the spirit and scope of the invention.

We claim:

1. A method for achieving a dynamic firing sequence for ultrasound imaging apparatus comprising the steps of:

providing operator selected parameters;

storing predetermined system constants;

calculating PRI using the operator selected parameters and the predetermined system constants;

calculating a minimum vector time using the operator selected parameters and the predetermined system constants;

maximizing frame rate using the PRI calculation and the minimum vector time calculation;

interleaving color firings with Doppler firings; and maximizing number of color positions that can be interleaved.

2. A method for achieving a dynamic firing sequence as claimed in claim 1 wherein the operator selected parameters comprise imaging depth.

3. A method for achieving a dynamic firing sequence as claimed in claim 1 wherein the operator selected parameters comprise:

velocity scale;

Doppler range gate position; and

Doppler range gate size.

4. A method for achieving a dynamic firing sequence as claimed in claim 1 wherein the operator selected parameters comprise;

velocity scale; and region of interest depth.

5. A method for maximizing frame rate for ultrasound imaging apparatus comprising the steps of:

providing operator selected parameters;

storing predetermined system constants;

calculating PRI using the operator selected parameters and the predetermined system constants;

calculating a minimum vector time using the operator selected parameters and the predetermined system constants; and maximizing interleaving of color firings with Doppler firings using the PRI calculation and the minimum vector time calculation.

6. A method for achieving a dynamic firing sequence as claimed in claim 5 wherein the operator selected parameters comprise imaging depth.

7. A method for achieving a dynamic firing sequence as claimed in claim 5 wherein the operator selected parameters comprise:

velocity scale;

Doppler range gate position; and

Doppler range gate size.

8. A method for achieving a dynamic firing sequence as claimed in claim 5 wherein the operator selected parameters comprise;

velocity scale; and region of interest depth.

* * * * *